(12) United States Patent
Hucker

(10) Patent No.: US 6,278,375 B1
(45) Date of Patent: Aug. 21, 2001

(54) SEVERE STORM WARNING DEVICE

(76) Inventor: Wade A. Hucker, 30114 52nd St., Salem, WI (US) 53168

(*) Notice: Subject to any disclaimer, the term of this patent is extended or adjusted under 35 U.S.C. 154(b) by 0 days.

(21) Appl. No.: 09/592,877

(22) Filed: Jun. 13, 2000

Related U.S. Application Data (63) Continuation-in-part of application No. 09/404,170, filed on Sep. 24, 1999.

(51) Int. Cl.$^7$ .................................................. G01W 1/00
(52) U.S. Cl. ....................... 340/601; 340/825.03; 325/364
(58) Field of Search .................................. 340/601, 236, 340/825.69, 825.03, 825.04; 325/364

(56) References Cited

U.S. PATENT DOCUMENTS

| | | | |
|---|---|---|---|
| 5,121,430 | * | 6/1992 | Ganzer et al. ........................ 455/58 |
| 5,444,433 | * | 8/1995 | Gropper ............................... 340/601 |
| 5,995,553 | * | 11/1999 | Crandall et al. ...................... 455/404 |
| 6,112,074 | * | 8/2000 | Pinder ................................. 455/404 |

* cited by examiner

*Primary Examiner*—Jeffery Hofsass
*Assistant Examiner*—Daniel Previl
(74) *Attorney, Agent, or Firm*—Boyle Fredrickson Newholm Stein & Gratz S.C.

(57) ABSTRACT

A device and method are provided for warning of the approach of severe weather in a geographical area. The device includes a receiver for receiving a broadcast signal having a first component corresponding to one of a plurality of geographical areas and the second component corresponding to one of a plurality of types of severe weather. Selection devices are provided for allowing the user to select the geographical area and the type of weather for which the warning device monitors. A warning signal is provided to the user if the geographical area of the broadcast signal is the selected geographical area and if the type of severe weather approaching is of a type of weather for which the warning device is monitoring.

18 Claims, 5 Drawing Sheets

SEVERE STORM WARNING DEVICE

RELATED APPLICATION

This application is a continuation-in-part of U.S. Ser. No. 09/404,170, filed Sep. 24, 1999 and entitled SEVERE STORM WARNING DEVICE.

FIELD OF INVENTION

This invention relates generally to warning devices and, more particularly, to a device and a method for warning of the approach of severe weather and tornadoes.

BACKGROUND OF THE INVENTION

Each year several people are either killed or injured as a result of severe weather in general and tornadoes in particular. While severe weather is inevitable, particularly in the spring of the year, death and injury resulting from such weather can be reduced provided sufficient warning is received in time to allow people to seek appropriate shelter.

Current systems are available that warn of the approach of an oncoming storm. These systems are deficient, however, in that they usually provide weather or tornado warnings that cover a rather large area. Because tornados usually cut a path no more than a mile wide, the fact that current warnings are issued to cover a multi-county area tends to lull people into complacency as far as seeking shelter. As a result, once one realizes that a tornado is definitely in their area, there is often not enough time to take shelter in an appropriate place. For this reason, a device whose warning of approaching severe weather or tornadoes is limited to a specific area would be an important improvement in the art.

Several devices currently exist that warn of tornadoes or severe weather once the storm is in your area. Such devices are disclosed in U.S. Pat. No. 3,753,117 (Downing et al.) and U.S. Pat. No. 5,355,350 (Bass et al.). The devices disclosed in these patents rely on particular environmental characteristics generated by an approaching tornado. The Bass et al. patent for example senses certain sounds generated by an approaching storm. Depending on the frequencies, amplitudes, and rate of change of the amplitudes sensed by the Bass et al. device, an acoustic alarm is activated. Downing et al. receives electrical signals which result from the electrical activity associated with an approaching storm. Other devices sense certain electromagnetic or radio frequency emissions resulting from a particular weather pattern or storm. Such devices are disclosed in U.S. Pat. No. 3,245,078 (Kohl) and U.S. Pat. No. 3,646,540 (Cooper). Still other warning devices such as the ones disclosed in U.S. Pat. No. 3,717,861 (Wright, Jr.) and U.S. Pat. No. 4,632,052 (Green) are triggered by the sudden drop in barometric pressure that is associated with an approaching tornado.

The problem with the above identified warning devices is that they do not sense a tornado until the storm is directly upon a particular area. This allows little or no time to respond, particularly if one has to round up children and/or pets before heading to a storm shelter. For this reason, a tornado warning device that provides a warning that is limited to a specific area yet is activated soon enough to allow time to respond would be an important improvement in the art.

Beginning in 1997, the Emergency Broadcast System was replaced with the Emergency Alert System (EAS). The EAS uses Specific Area Message Encoding (S.A.M.E.) technology to distribute messages thereby allowing for great improvement in how the public is provided with emergency information. The new system allows state and local officials to quickly send out important area-specific state and local emergency information. S.A.M.E. uses digital codes developed by the National Weather Service (NWS). Using these codes, NWS offices can originate coded messages that are area-specific thereby allowing emergency warnings to be transmitted to people only in the affected geographic area.

Currently, EAS signals are received in specially equipped consumer products such as televisions, and radios. However, no warning device exists that is capable of being mounted on the wall or ceiling of a room or, placed on a counter top. Such a device would be an important improvement in the art as it would allow individuals who may be involved in activities unrelated to radio or television when the warning is issued to be able to hear the alarm. Therefore, a device capable of operating in a standby mode whereby it receives the codes transmitted by the NWS and activates a warning signal in response to a particular preselected code without any user interaction would be an important improvement in the art.

OBJECTS OF THE INVENTION

An object of the invention is to provide a device and method for warning of the approach of severe weather and tornadoes that overcomes some of the problems and shortcomings of the prior art.

Another object of the invention is to provide a device and method for warning of the approach of severe weather and tornadoes that limits such warning to severe weather occurring in a specific area.

Another object of the invention is to provide a device and method for warning of the approach of severe weather and tornadoes that is capable of being mounted on a wall or ceiling.

How these and other objects are accomplished will become apparent from the following descriptions and the drawings.

SUMMARY OF THE INVENTION

In accordance with the present invention, a warning device is provided for warning of the approach of severe weather to a geographical area. The warning device includes a receiver for receiving a broadcast signal. The broadcast signal has a first component corresponding to one of the plurality of geographical areas and a second component corresponding to one of a plurality of types of severe weather. A geographical selection device having a plurality of settings is also provided. Each setting of the geographical selection devices corresponds to a selected geographical area. A weather selection device corresponding to a first type of severe weather is also provided. The weather selection device is movable between a first on position wherein a warning signal is generated in response to a selected geographical area being the same as the first component of the broadcast signal and to the second component of the broadcast signal being the same as the first type of severe weather and a second off position. It is contemplated that a signal indicate that a weather selection device is in the on position.

The warning signal has a first audible component and a second visual component. The audible component of the warning signal is generated for a predetermined time period. Thereafter, the visual component of the warning signal is generated. The warning device may include an acknowledge button movable between a first off position and a second on position for terminating the first audible component of the warning signal prior to completion of a predetermined time period.

In accordance with a still further aspect of the present invention, a warning device is provided for warning of the approach of severe weather to a geographical area. The warning device includes a receiver for receiving a broadcast signal. The broadcast signal has a first component corresponding to one of a plurality of geographical areas and a second component corresponding to one of a plurality of types of severe weather. A geographical selection device is provided having a plurality of settings. The setting of the geographical selection device corresponds to a selected geographical area. A plurality of weather selection devices is also provided. Each weather selection device responds to one of the plurality of types of severe weather and is movable between a first on position and a second off position. A comparator circuit compares the first component of the broadcast signal to the setting of the geographical selection device such that a warning signal is generated in response to the setting of the geographical selection device being the same of the first component of the broadcast signal and in response to the weather selection device corresponding to the type of severe weather of the second component of the broadcast signal being in the on position. A plurality of visual displays are positioned adjacent to corresponding weather selection devices for indicating that a weather selection device is in the on position.

The warning signal includes an audible component which is generated for a predetermined time period. The warning device includes an acknowledgment button which is movable between a first non-depressed position and a second depresed position for determining the first audible component of the warning signal prior to completion of the predetermined time period.

The warning device may also include a plurality of visual warning displays. Each visual warning display is positioned adjacent the corresponding weather device such that the visual warning display positioned adjacent the weather selection device corresponding to the type of severe weather of the second component of the broadcast signal is illuminated upon completion of the predetermined time period.

In accordance with a still further aspect of the present invention, a method is provided for warning an individual of the approach of one of a plurality of types of severe weather to a geographical area. The method includes the steps of monitoring the broadcast signal which has a first component corresponding to one of a plurality of geographical areas and a second component corresponding to one of a plurality of types of severe weather. A geographical selection device is set to one of a plurality of settings. Each setting corresponds to a selected first component of the broadcast signal to be monitored by the receiver. A plurality of weather selection devices are provided. Each weather selection device corresponds to a unique type of severe weather and is movable between a first selected position and a second non-selected position. At least one of the plurality of weather selection devices is moved to in the selected position. Thereafter, the first component of the broadcast signal is compared to the setting of the geographical selection device such that a warning signal is generated in response to the setting of the geographical selection device being the same as the first component of the broadcast signal and the weather selection device corresponding to the type of weather of the second component of the broadcast signal being in the selected position.

It is contemplated to generate a visual signal to indicate that a corresponding weather selection device is in the selected position. The warning signal has a first audible component and a second visual component. The first audible component of the warning signal is generated for a predetermined time period. The second visual component of the warning signal is generated upon completion of the predetermined time period. An acknowledge button is provided which is movable between a first off position and a second on position for terminating the first audible component of the warning signal prior to completion of the predetermined time period.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTIONS OF THE PREFERRED EMBODIMENTS

The invention involves a warning device 10 for warning of the approach of severe weather and tornadoes to a particular geographical area. Such a device 10 may be nailed to the wall or ceiling of a room or mounted in any other conventional manner known.

Figure 1:
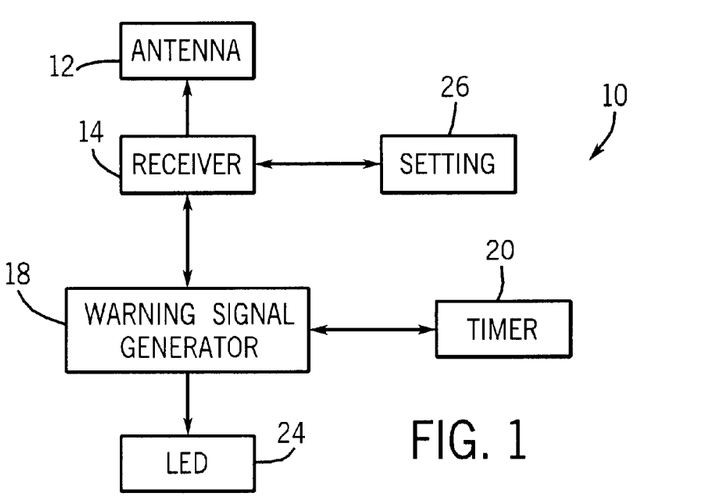
FIG. 1 is a schematic of the severe weather warning device.

As shown in the schematic in FIG. 1, the invention is comprised of a receiver 14 having an antenna 12 for monitoring a broadcast signal, a selection device 26 is operatively connected to the receiver. The selection device 26 includes a plurality of user selected settings with each setting corresponding to a selected broadcast signal to be monitored by the receiver 14. A warning signal generator 18 is operatively connected to the receiver 14, whereby the warning signal generator 18 generates a warning signal in response to the broadcast signal being the same as the selected broadcast signal.

Figure 3:
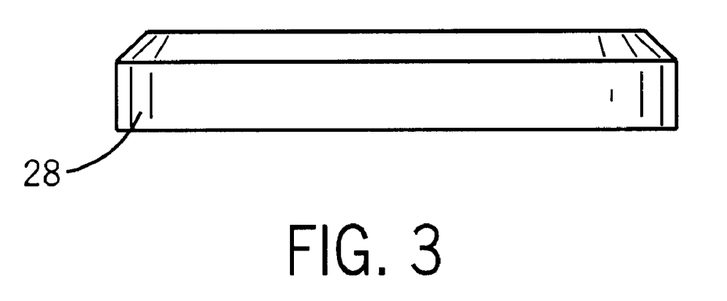
FIG. 3 is a side view of a particular housing that is used to enclose the tornado warning device.
Figure 4:
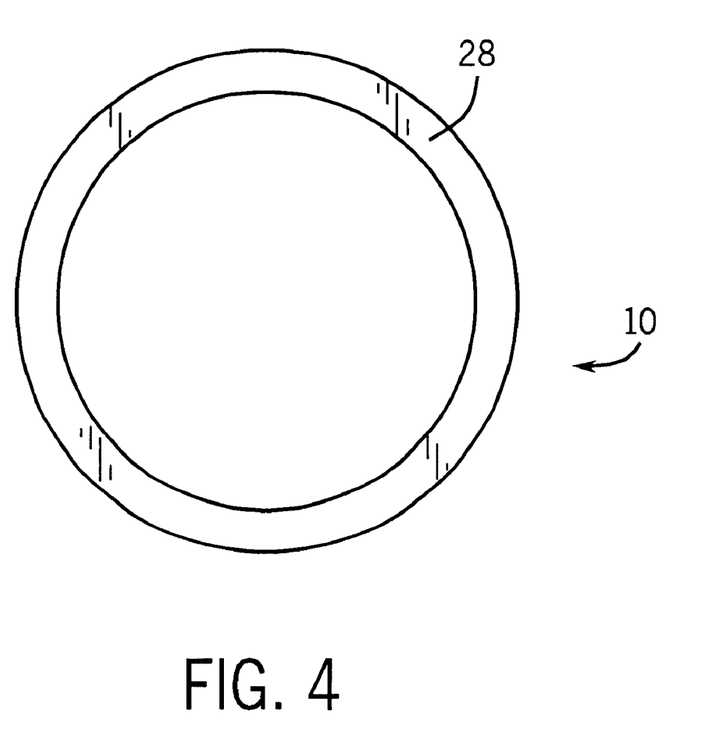
FIG. 4 is a top view of a particular housing that is use to enclose the tornado warning device.
Figure 5:
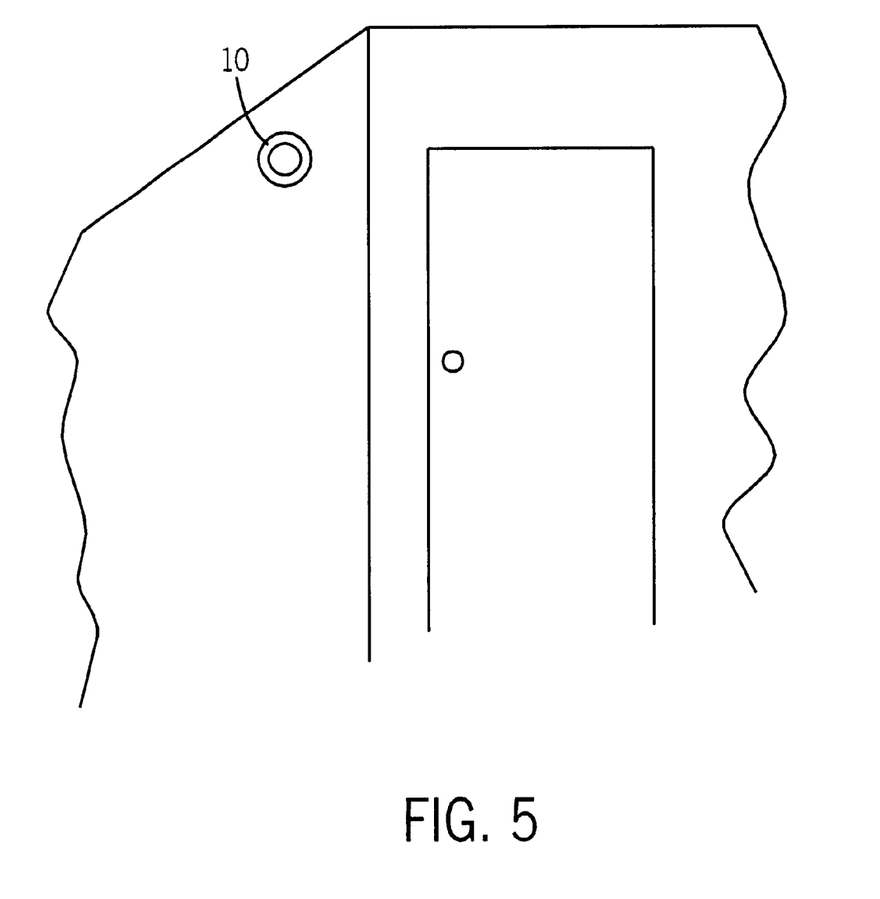
FIG. 5 is a perspective view of a section of a room showing the tornado warning device mounted on a wall.

The device is preferably battery operated and includes a receiver 14 which can be one of several conventional receivers that are capable of receiving the broadcast signals transmitted by the National Weather Service. The receiver 14 along with the selection device 26 and warning signal generator 18 are all contained in a housing 28 that is capable of being hung on the ceiling or wall of a room, as shown in FIGS. 3–5.

Figure 2:
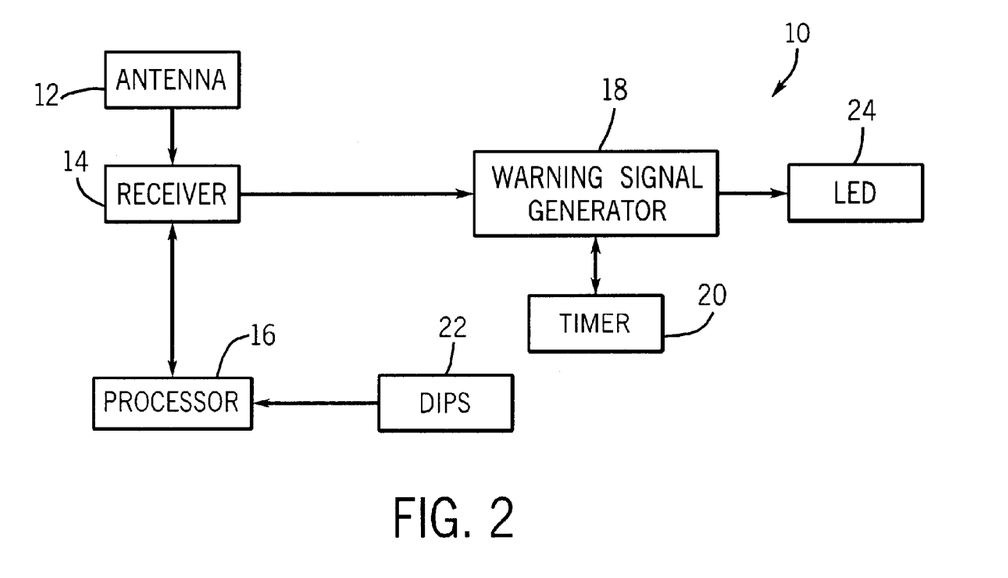
FIG. 2 is a schematic of a second embodiment of the severe weather warning device.

In one embodiment of the invention, the selection device 26 includes a dip switch 22 that has a plurality of positions. Each of the positions of the dip switch 22 correspond to a setting for the selection device 26. In order to operate the warning device 10, the user presents the dip switch 22 to a setting that corresponds to the signal frequency for the particular county or area the user is located in. In a specific version of this embodiment, as shown in FIG. 2, the warning device 10 further includes a comparing circuit having a processor 16 with first and second inputs. In such a processor 16, the first input is operatively connected to the dip switch 22 while the second input is operatively connected to the receiver 14.

In another embodiment of the invention, the warning signal generator 18 is operatively connected to the comparing circuit. In such arrangement, the warning signal generator generates an alarm in response to the broadcast signal being the selected broadcast signal. This alarm can be in several forms including an audible tone, a visual component such as an LED 24, or any combination thereof.

In yet another embodiment of the invention, a time-delay relay 20 is electrically connected to the warning signal generator 18. This relay 20 allows the warning signal to be automatically interrupted after a set period of time. The device may also be equipped with an acknowledge button that is operably connected to the warning signal generator 18, wherein the alarm may be manually overridden by depressing the button.

When in operation, the receiver 12 scans the selected settings 26 in order to determine the frequency to monitor. While monitoring the frequencies transmitted by the NWS, should the receiver 14 receive the pre-selected frequency, a warning signal is generated. Such warning signal may be an aural tone, a visual display such as a LED, or a combination of the two.

The invention also involves a method for warning of the approach of severe weather including a tornado. The method which involves the steps of providing at least one set of dual-in-line package (DIP) switches to a severe weather warning device; selecting a predetermined broadcast signal from the National Weather Service; presetting the dual-in-line package switches to the predetermined broadcast signal; receiving multiple broadcast signals transmitted by the National Weather Service; comparing the multiple broadcast signals received from the National Weather Service with the predetermined broadcast signal preset in the dual-in-line package switches; identifying one of the multiple broadcast signals as the predetermined broadcast signal; activating a transmitter in response to the predetermined broadcast signal; and transmitting an alarm to warn of the approaching severe weather.

The alarm that is transmitted can be in one of several forms including a visual warning, an audible tone, or a combination of the two.

Figure 6:
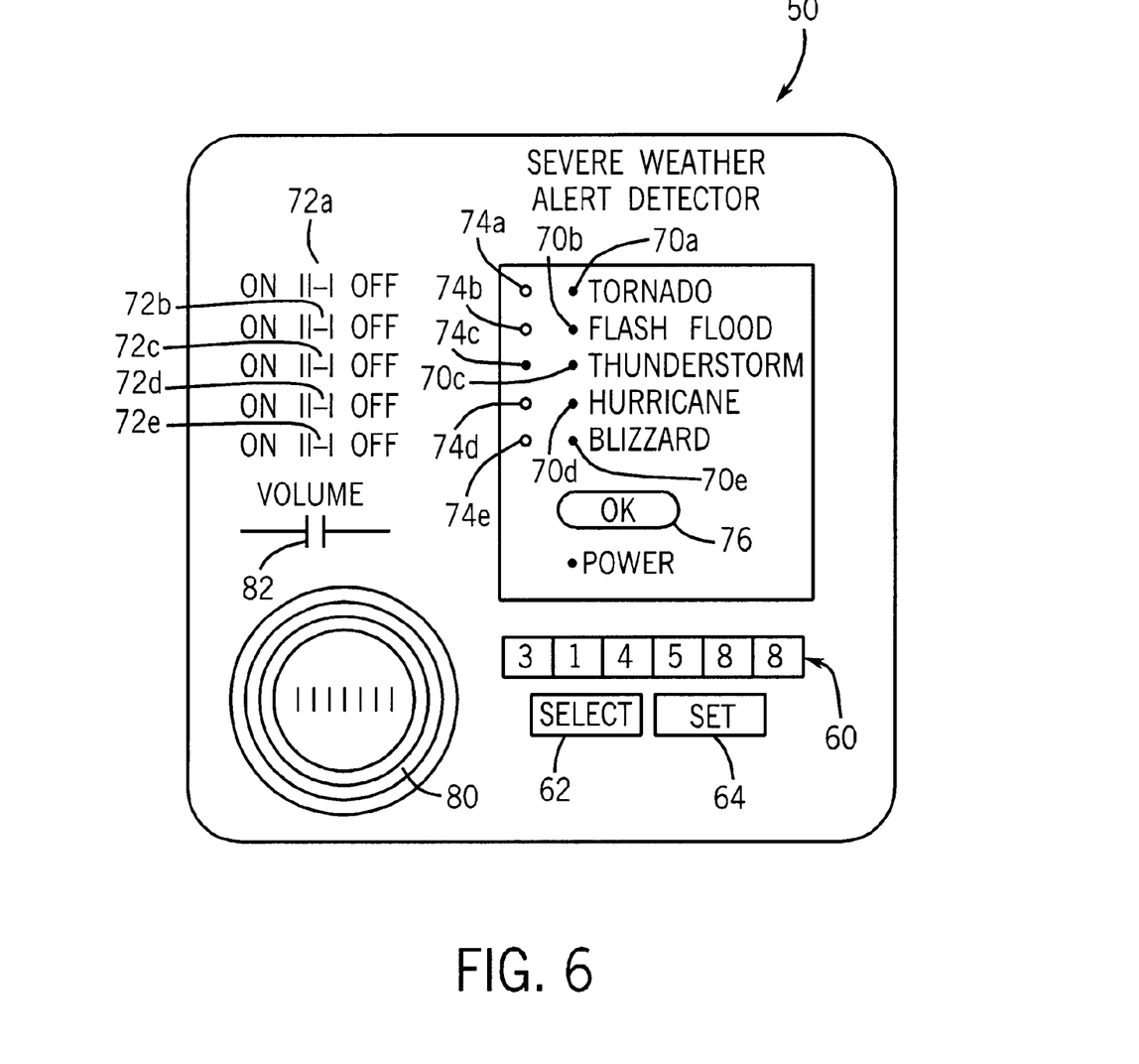
FIG. 6 is a top plan view of a third embodiment of a severe weather warning device in accordance with the present invention.
Figure 7:
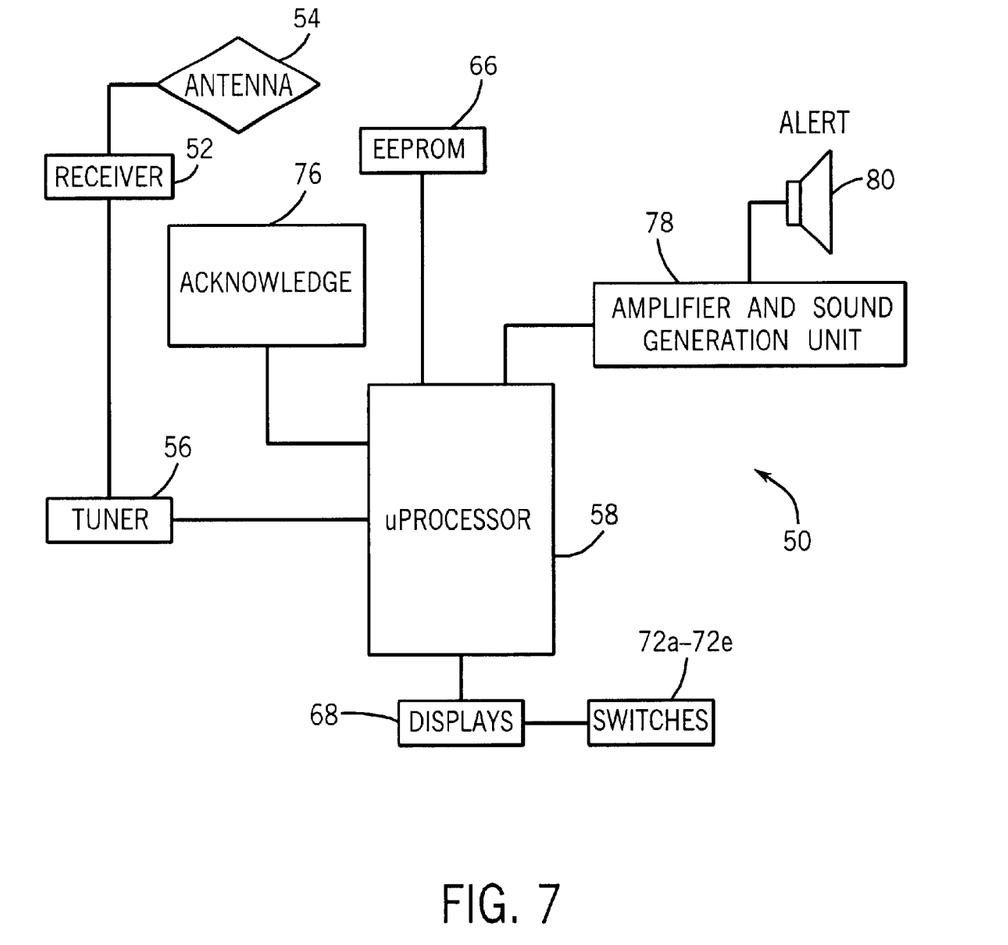
FIG. 7 is a schematic of the severe weather warning device of FIG. 6.

Referring to FIGS. 6 and 7, a further embodiment of a severe weather warning device is generally designated by the reference numeral 50. Device 50 is intended to monitor the broadcasts of the National Weather Service for a digital S.A.M.E. code. As is known, the S.A.M.E. code broadcast by the National Weather Service contains information on the type of warning presented, the geographical area to which the warning applies, and the expiration time of the warning.

Device 50 includes a receiver 52 having an antenna 54 monitoring for the broadcasts from the National Weather Service. A tuner 56 is operatively connected to receiver 52 and to microprocessor 58. Tuner 56 includes a display 60 for displaying a S.A.M.E. code to be selected by a user. A selection switch 62 allows a user to select the S.A.M.E. code corresponding to the individual's geographical area. Once the proper S.A.M.E. code has been entered by the individual for a desired geographical area, such code is set by using set button 64 of tuner 56.

Device 50 further includes an EEPROM 66 operatively connected to microprocessor 58. EEPROM 66 is intended to store information regarding the S.A.M.E. codes broadcast by the National Weather Service. In addition, a plurality of displays, generally designated by the reference numeral 68, are operatively connected to microprocessor 58. Displays 68 include selected displays 70a–70e which correspond to specific types of severe weather which may approach a geographical area to which a S.A.M.E. code has been broadcast. By way of example, selected display 70a corresponds to a tornado; selected display 70b corresponds to a flash flood; selected display 70c corresponds to a thunderstorm; selected display 70d corresponds to a hurricane; and selected display 70e corresponds to a blizzard. Selected displays 70a–70e are interconnected to and controlled by corresponding switches 72a–72e such that each switch 72a–72e controls activation of a corresponding selected display 70–70e, for reasons hereinafter described.

Displays 68 further include a plurality of visual weather displays 74a–74e. Each visual weather display 74a–74e corresponds to a specific type of severe weather which may approach a geographical area. By way of example, visual weather display 74a corresponds to a tornado; visual weather display 74b corresponds to a flash flood; visual weather display 74c corresponds to a thunderstorm; visual weather display 74d corresponds to a hurricane; and visual weather display 74e corresponds to a blizzard.

Device 50 further includes an acknowledge button 76 operatively connected to processor 58, for reasons hereinafter described, and amplifier and sound generation unit 78, also interconnected to microprocessor 58. A speaker 80 is operatively connected to amplifier and sound generation unit 78 for generating a warning signal to the individual to indicate the approach of severe weather. A volume control 82 is also interconnected to amplifier and sound generation unit 78 for controlling the volume of the warning signal generated.

In operation, a user selects a six digit S.A.M.E. code corresponding to the geographical area in which the user is located utilizing selection switch 62. With the desired S.A.M.E. code displayed on S.A.M.E. code display 60, the code is sent to microprocessor by depressing set button 64. In addition, the types of severe weather the individual wishes device 50 to monitor (i.e. tornado, flash flood, thunderstorm, hurricane or blizzard) are set by moving corresponding switches 72a–72e to the on position. By positioning switches 72a–72e in the on position, corresponding selected displays 70a–70e are illuminated, and corresponding signals are provided to microprocessor 58 such that device 50 monitors for the types of severe weather corresponding to the illuminated selected displays 70a–70e.

Thereafter, receiver 52 monitors for a broadcast signal from the National Weather Service having the six digit S.A.M.E. code entered by the user and displayed on S.A.M.E. code display 60. Should receiver 52 receive a broadcast signal corresponding to the six digit S.A.M.E. code displayed on display 60, such broadcast signal is transmitted to microprocessor 58. Microprocessor 58 compares the information received in the broadcast signal regarding the type of severe weather approaching with the types of severe weather for which it is monitoring in response to the position of switches 72a–72e. If the type of severe weather approaching is the same as one of the types of severe weather for which device 50 is monitoring, microprocessor 58 instructs amplifier and sound generation unit 78 to generate an audible warning signal through speaker 80 at a volume dictated by volume control 82. The audible warning signal continues for a predetermined time period unless an individual depresses acknowledge button 76 whereby acknowledge button 76 terminates the audible warning signal.

Upon completion of the predetermined time period, visual warning display 74a–74e corresponding to the type of severe weather for which the National Weather Service broadcasted the S.A.M.E. code is illuminated so as to provide a visual warning signal to an individual utilizing device 50. By way of example, FIG. 6 shows visual warning display 74c in the on position. Once again, depression of acknowledge button 76 terminates illumination of visual warning display, i.e. visual warning display 74c.

While the principles of the invention have been shown and described in connection with but a few embodiments, it is to be understood clearly that such embodiments are by way of example and are not limiting.

What is claimed is:

1. A warning device for warning of the approach of severe weather to a geographical area, the warning device comprising:
   a receiver for receiving a broadcast signal, the broadcast signal having a first component corresponding to one of a plurality of geographical areas and a second component corresponding to one of a plurality of types of severe weather;
   a geographical selection device having a plurality of settings, each setting corresponding to a selected geographical area;
   a weather selection device corresponding to a first type of severe weather, the weather selection device movable between a first on-position wherein a warning signal is generated in response to the selected geographical area being the same as the first component of the broadcast signal and to the second component of the broadcast signal being the same as the first type of severe weather and a second off-position; and
   a second weather selection device corresponding to a second type of severe weather, the second weather selection device movable between a first on-position wherein a warning signal is generated in response to the selected geographical area being the same as the first component of the broadcast signal and to the second component of the broadcast signal being the same as the second type of severe weather and a second off-position.

2. The warning device of claim 1 further comprising a signal for indicating that the weather selection device is in the on-position.

3. The warning device of claim 1 wherein the warning signal has an audible component and a visual component.

4. The warning device of claim 3 wherein the audible component of the warning signal is generated for a predetermined time period.

5. The warning device of claim 4 wherein the visual component of the warning signal is generated upon completion of the predetermined time period.

6. The warning device of claim 4 further comprising an acknowledge button, the acknowledge button movable between a first off-position and a second on-position for terminating the first audible component of the warning signal prior to completion of the predetermined time period.

7. A warning device for warning of the approach of severe weather to a geographical area, the warning device comprising:
   a receiver for receiving a broadcast signal, the broadcast signal having a first component corresponding to one of a plurality of geographical area and a second component corresponding to one of a plurality of types of severe weather;
   a geographical selection device having a plurality of settings, each setting corresponding to a selected geographical area;
   a plurality of weather selection devices, each weather selection device corresponding to one of the plurality of severe weather and being movable between a first on-position and a second off-position;
   a comparator circuit for comparing the first component of the broadcast signal to the setting of the geographical selection device such that a warning signal is generated in response to the setting of the geographical selection device being the same as the first component of the broadcast signal and in response to the weather selection device corresponding to the type of severe weather of the second component of the broadcast signal being in the on-position; and
   a plurality of visual displays, each visual display positioned adjacent a corresponding weather selection device for indicating that the weather selection device is in the on-position.

8. The warning device of claim 7 wherein the warning signal includes an audible component.

9. The warning device of claim 8 wherein the audible component of the warning signal is generated for a predetermined time period.

10. The warning device of claim 9 further comprising an acknowledgment button, the acknowledgment button movable between a first non-depressed position and a second depressed position for terminating the first audible component of the warning signal prior to completion of the predetermined time period.

11. The warning device of claim 7 further comprising a plurality of visual warning displays, each visual warning display being positioned adjacent a corresponding weather selection device.

12. The warning device of claim 11 wherein the visual warning display positioned adjacent the weather selection device corresponding to the type of severe weather of the second component of the broadcast signal is illuminated upon completion of the predetermined time period.

13. A method of warning an individual of the approach of severe weather to a geographical area, comprising the steps of:
   monitoring for a broadcast signal having a first component corresponding to one of a plurality of geographical areas and a second component corresponding to one of a plurality of types of severe weather;
   setting a geographical selection device to one of a plurality of settings, each setting corresponding to a selected first component of the broadcast signal to be monitored by the receiver;
   providing a plurality of weather selection devices, each weather selection device corresponding to a unique type of severe weather and being movable between a first selected position and a second non-selected position;
   moving at least one of the plurality of the weather selection devices to the selected position; and comparing the first component of the broadcast signal to the setting of the geographical selection device such that a warning signal is generated in response to the setting of the geographical selection device being the same as the first component of the broadcast signal and the weather selection device corresponding to the type of severe weather of the second component of the broadcast signal being in the selected position.

14. The method of claim 13 further comprising the step of generating a visual signal to indicate that a corresponding weather selection device is in the selected position.

15. The warning device of claim 13 wherein the warning device signal has an audible component and a visual component.

16. The warning device of claim 15 wherein the audible component of the warning signal is generated for a predetermined time period.

17. The warning device of claim 16 wherein the visual component of the warning signal is generated upon completion of the predetermined time period.

18. The warning device of claim 16 further comprising an acknowledge button, the acknowledge button movable between a first off-position and a second on-position for terminating the first audible component of the warning signal prior to completion of the predetermined time period.

* * * * *